Jan. 5, 1965   E. A. STEINGROEVER   3,164,756
ADJUSTABLE PERMANENT MAGNET
Filed May 16, 1962   2 Sheets-Sheet 1

Jan. 5, 1965  E. A. STEINGROEVER  3,164,756
ADJUSTABLE PERMANENT MAGNET
Filed May 16, 1962  2 Sheets-Sheet 2

3,164,756
ADJUSTABLE PERMANENT MAGNET
Erich A. Steingroever, Bonn, Germany, assignor to Elektro-Physik Hans Nix & Dr. Ing. Steingroever, Cologne-Niehl, Germany
Filed May 16, 1962, Ser. No. 195,129
3 Claims. (Cl. 317—159)

This invention relates to an adjustable permanent magnet whose magnetic flux may be initiated and selectively reversed inside an air gap defined by suitably disposed soft iron conductor members.

In prior art adjustable permanent magnet systems, one or more cylindrical magnets, which are cross magnetized, are arranged rotatably between soft iron poles, the cylindrical surfaces of the magnets being connected to the soft iron members. By a rotation of the magnets around their axis the magnetic flux is adjusted relative to the soft iron poles. However, this arrangement of adjustable permanent magnet systems is not adapted for obtaining high magnetic field forces and is not suitable for using large air gaps, because the diameter of the cylindrical magnets cannot be made very large. But in order to obtain a high magnetic field force in the air gap a substantial length of the magnet in the direction of magnetization is required in view of the known formula $$L_M = \frac{H_L \cdot L_L}{H_M}$$

in which $L_M$ is the magnetic length in the direction of magnetization, $L_L$ is the length of the air gap, $H_L$ is the field in the air gap, $H_M$ is the field in the magnetic material. The value $H_M$ lies in the case of the usual magnetic material at 300 . . . 600 oersted for alnico magnets or at 800 . . . 1200 oersted for oxide magnets.

According to the invention, it is possible to construct permanent magnet systems having large air gaps as well as high field forces in the air gap while mantaining high values for $L_M$. The invention consists in providing an arrangement comprising a U-shaped one-piece or composite permanent magnet which is rotatable around its longitudinal axis in such a manner that its poles cover the connecting surfaces of the soft iron mmebers forming the air gap in a continuously changing manner. In this case each pole of the permanent magnet may contact one or the other soft iron conductor member to a greater or lesser degree and induce it so that the field force in the air gap may be adjusted between any desired positive and negative values, thus also between 0 and each positive and negative value within the range that is possible in the system.

An embodiment of the invention is illustrated in the drawing in which.

Figure 1:
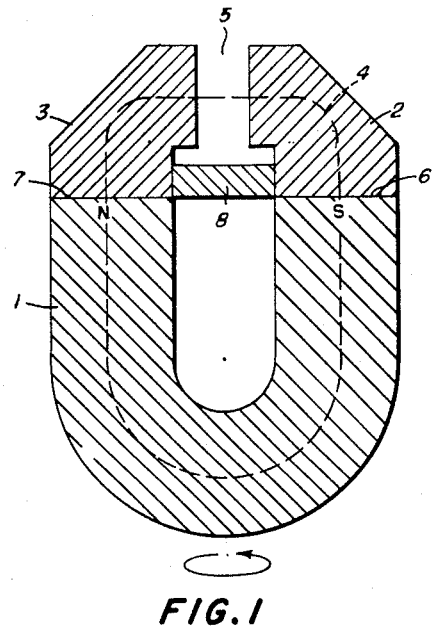
FIG. 1 is a cross-sectional elevation of a magnet according to the invention.
Figure 2:
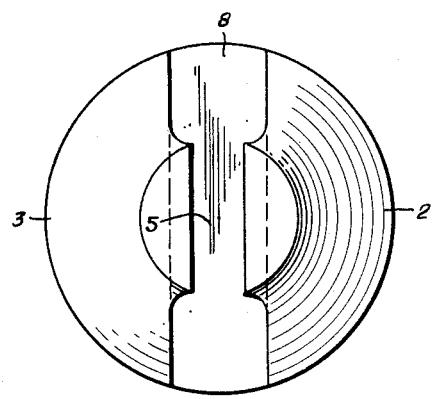
FIG. 2 is a plan view of the magnet according to FIG. 1.

Referring now to FIGS. 1 and 2 of the drawing, numeral 1 designates the U-shaped one-piece permanent magnet having poles N and S and consisting for example of an alnico metal alloy. The soft iron conductor members 2 and 3 for the magnetic flux 4 indicated in dotted lines are spaced from each other to define the air gap 5. Conductor members 2 and 3 are connected by contact surfaces 6 and 7 to the poles of the permanent magnet, conductor 3 being connected to the north pole N and conductor member 2 to the south pole S of the permanent magnet. The soft iron conductors are securely connected to each other through a non-magnetic support member 8 such as by soldering. For the purpose of regulating the magnetic field in the air gap the permanent magnet 1 is rotated around its longitudinal axis shown in dotted line in the drawing so that its poles make increasingly greater contact with the opposite soft iron conductor members. In a central position, after a rotation of 90°, the two poles N and S are short-circuited by the conductor members so that a field 0 is present in the air gap. After a further rotation of 90° the pole N is connected to the conductor member 2 and the pole S to the conductor member 3 so that the magnetic field present in the air gap is reversed with respect to the initial condition at the start of the rotation.

Figure 3:
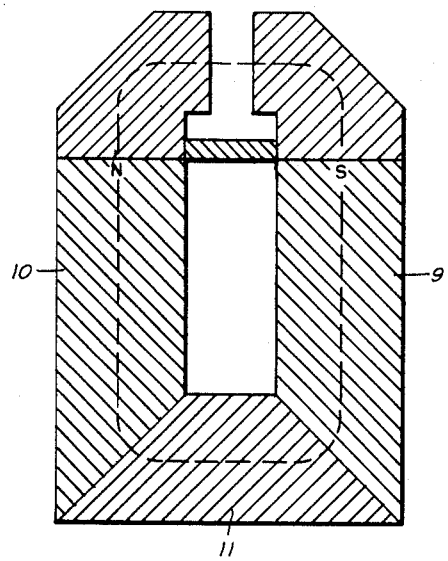
FIG. 3 is a cross-sectional elevation of another embodiment of a magnet according to the invention.

Referring now particularly to FIG. 3 of the drawing, the permanent magnet is composed of three parts 9, 10 and 11, of which the parts 9 and 10 are magnetized in the longitudinal direction of the system, while part 11 is magnetized in a direction transversely of parts 9 and 10.

Figure 4:
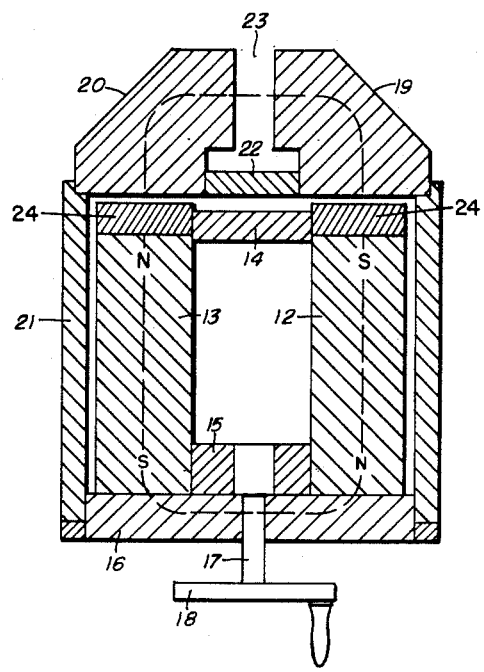
FIG. 4 is still another embodiment of the magnet according to this invention, shown also in cross-sectional elevation.

With regard to FIG. 4 of the drawing there is shown an additional embodiment of the invention which permits a particularly easy actuation of the adjustable magnetic system. In this arrangement the permanent magnet system consists of the two movable magnets 12 and 13 rotatable around the longitudinal axis and having an arcuate shape in cross-section. The magnets 12 and 13 are assembled to the non-magnetic intermediate members 14 and 15 to form a block, and are arranged slidably on the stationary iron feed back plate 16. The rotation is carried out by means of a shaft 17 and a hand wheel or a drive wheel 18. The poles 19 and 20 are mounted a short distance above the movable part of the magnetic system and are supported by the non-magnetic sleeve 21. Poles 19 and 20 are connected to each other by the non-magnetic member 22. It will be observed that in this arrangement only small friction forces are produced between the movable and the stationary parts of the magnetic system. As in the afore-mentioned embodiments the magnetic flux is indicated again in dotted lines and the magnetic field in the air gap 23 may be regulated by a rotation of the permanent magnets by means of the wheel 18 by 180° from the one maximum position through 0 to the opposite maximum position.

During the movement of the permanent magnet parts of the adjustable magnet system reverse magnetization may occur in the areas which are immediately adjacent the soft iron poles. This may be avoided according to the invention by providing the movable permanent magnets with soft iron plates 24 which may be secured thereto in any suitable manner, such as by soldering or the like. Furthermore, the contact surfaces between the movable and the stationary parts may be made plane as shown in FIGS. 1 through 4, or they may be made conical if desired. In manufacturing the permanent magnet parts, it is appropriate to use a material having high residual characteristics and high coercive strength, for example an alnico-alloy or an oxide-magnetic material having preferably a magnetic pre-orientation.

Adjustable permanent magnet systems according to the invention may find numerous applications in the measuring art, for example, to produce homogeneous or non-homogeneous fields, in moving-coil galvanometers, in magnetic scales, in $\mu-1$ measurement, to record the hysteresis curve of magnetic materials or in core resonance tests. It may also be used for nuclear resonance determinations. They may also find application as adhesion magnets, as tool or work holders in mechanical manufactures, or for assembling tensioning plates for iron work pieces.

I claim:
1. An adjustable permanent magnet holding system comprising
(1) a permanent magnet unit consisting of two parallel permanent magnets having an arcuate shape in cross-section and arranged with their poles in opposite directions, and non-magnetic means joining said magnets, said unit benig rotatable around its longitudinal axis,
(2) a cylindrical stationary non-magnetic housing surrounding said unit, and a magnetic feed back plate, said plate forming the bottom of said housing and supporting said permanent magnet unit,
(3) stationary feromagnetic pole pieces arranged to form a magnetic circuit with opposite poles of said two permanent magnets, and a non-magnetic spacing member connecting said pieces to a unit, said pole pieces defining an air gap and being supported on said housing in close spaced relationship but out of direct contact with said permanent magnets, and
(4) manipulating means mechanically connected to said permanent magnet unit for rotational displacement thereof.

2. An adjustable permanent magnet system according to claim 1 wherein the poles of the rotatable permanent magnets opposite said stationary pole pieces are provided with soft iron plates in order to prevent a demagnetization during the adjusting process.

3. Adjustable permanent magnet system according to claim 1 wherein the permanent magnets are made of a material having a magnetic pre-orientation.

References Cited in the file of this patent
UNITED STATES PATENTS

| | | |
|---|---|---|
| 2,280,437 | Levesque | Apr. 21, 1942 |
| 2,287,286 | Bing et al. | June 23, 1942 |
| 2,471,067 | Hitchcock | May 24, 1949 |
| 2,609,835 | Horvay | Sept. 9, 1952 |
| 2,888,617 | Baumet | May 26, 1959 |

FOREIGN PATENTS

| | | |
|---|---|---|
| 444,786 | Great Britain | Mar. 27, 1936 |